Figure 1:
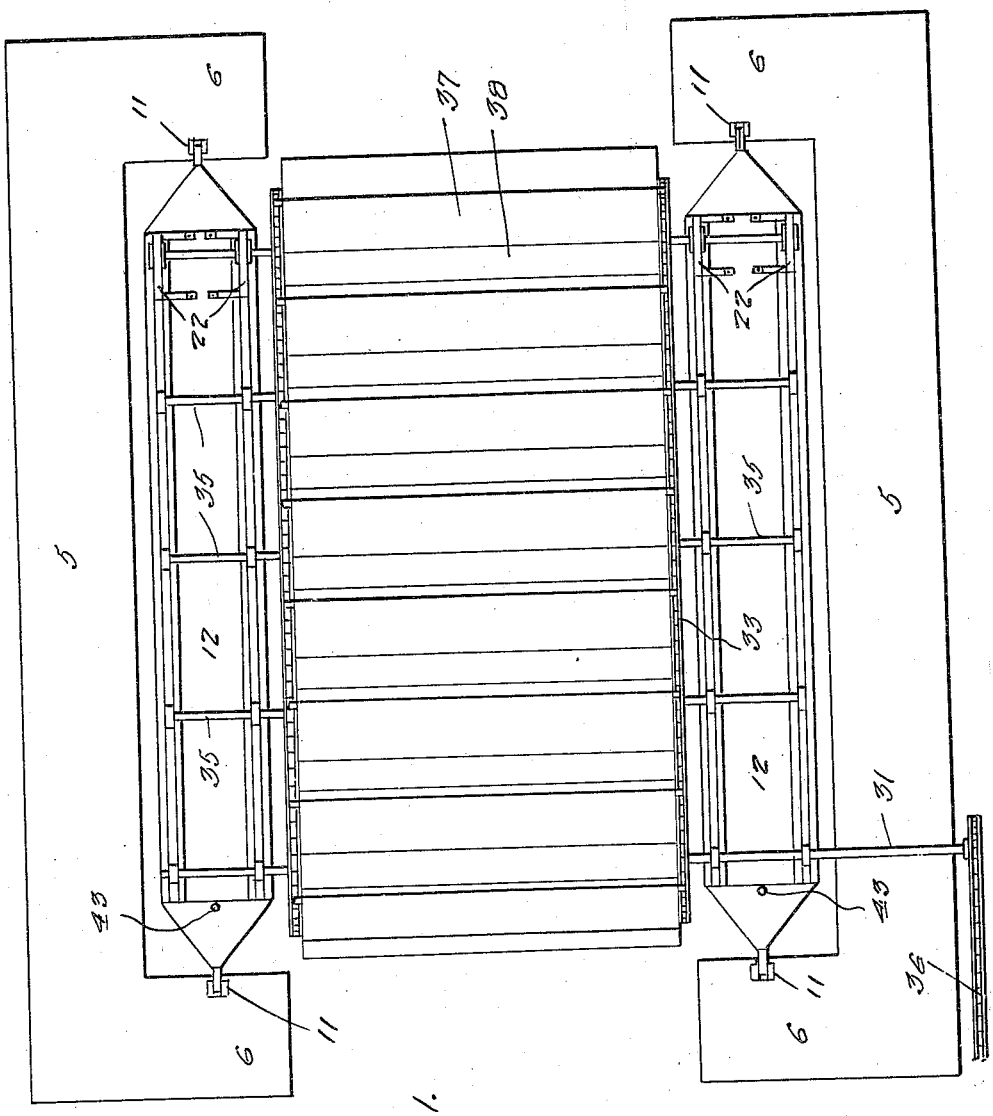

March 25, 1930.　　　　F. L. GAEDE　　　　1,751,513
WATER POWER GENERATOR
Filed Jan. 31, 1929　　　5 Sheets-Sheet 1

Inventor
Frank L. Gaede

By Clarence A. O'Brien
　　Attorney

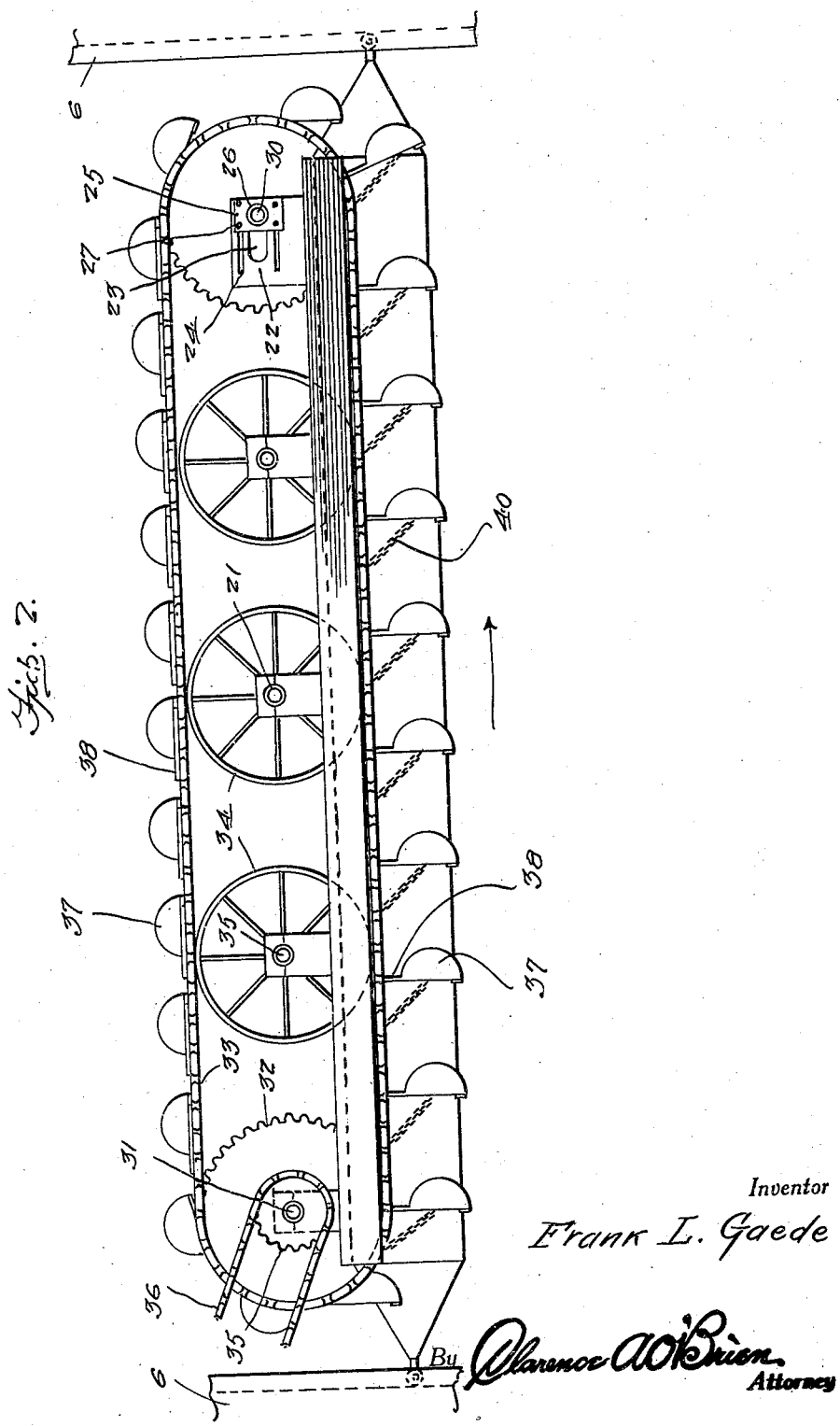

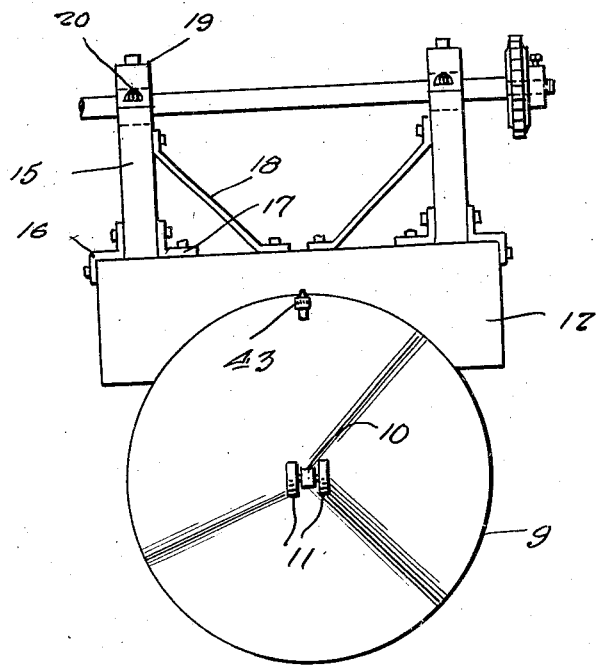
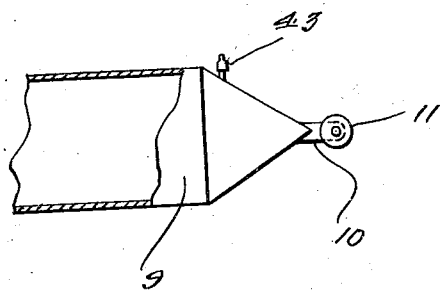
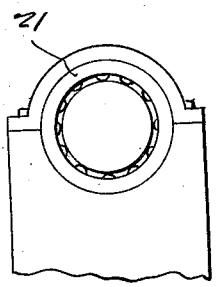

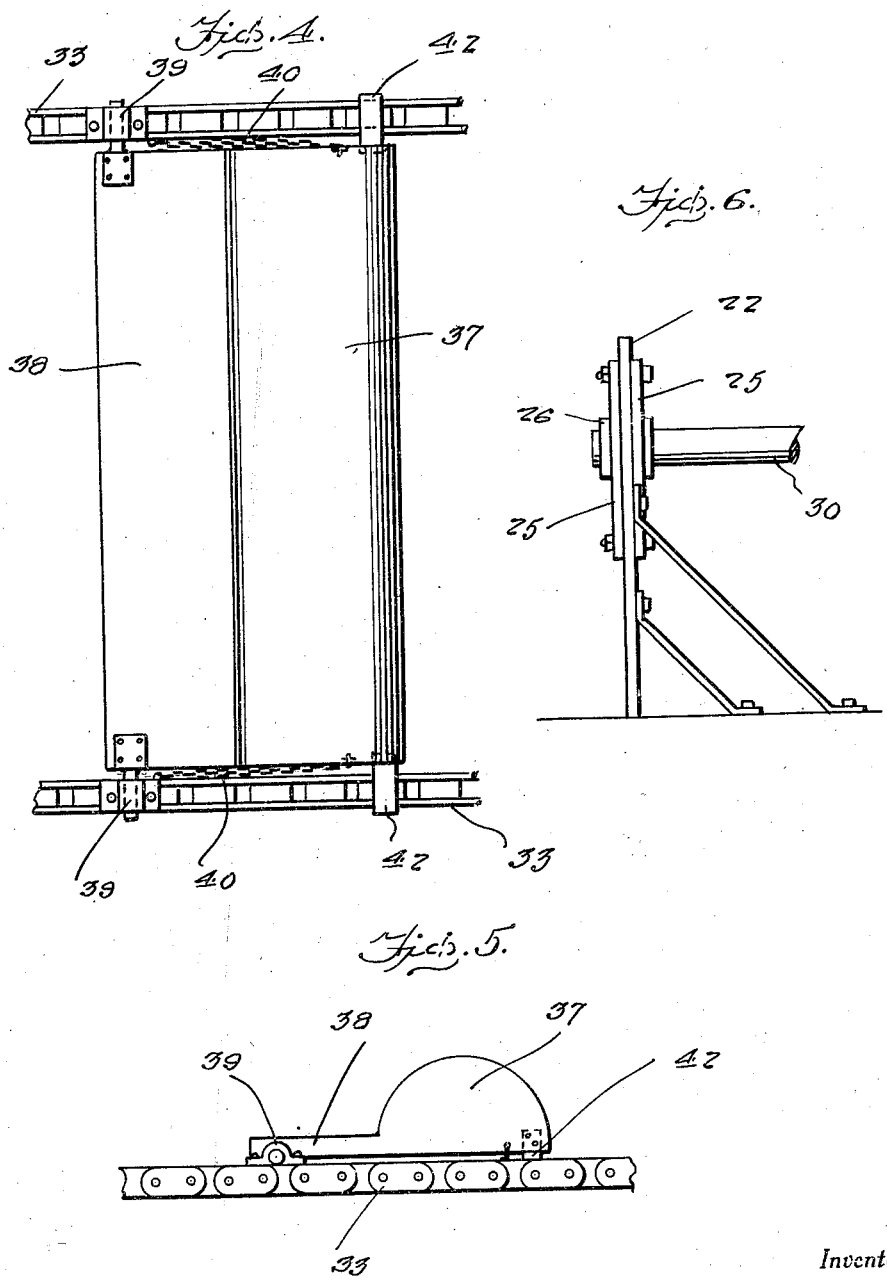

March 25, 1930.   F. L. GAEDE   1,751,513
WATER POWER GENERATOR
Filed Jan. 31, 1929   5 Sheets-Sheet 5

Inventor
Frank L. Gaede
By Clarence A. O'Brien
Attorney

Patented Mar. 25, 1930

1,751,513

UNITED STATES PATENT OFFICE

FRANK L. GAEDE, OF PLYMOUTH, INDIANA

WATER-POWER GENERATOR

Application filed January 31, 1929. Serial No. 336,544.

The present invention relates to a water power generator and has for its prime object to provide a mechanism for generating power from the surface current of rivers, streams and the like.

Another very important object of the invention resides in the provision of a floating structure carrying an endless mechanism including buckets for engaging with the surface of running water to propel the endless mechanism.

A still further very important object of the invention resides in the provision of a mechanism of this nature in combination with supporting structure to hold the same at a predetermined position in the stream but allowing the same to move up and down with the surface of the water.

A still further very important object of the invention resides in the provision of a mechanism of this nature which is simple in its construction, strong and durable, thoroughly efficient and reliable in operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 10:
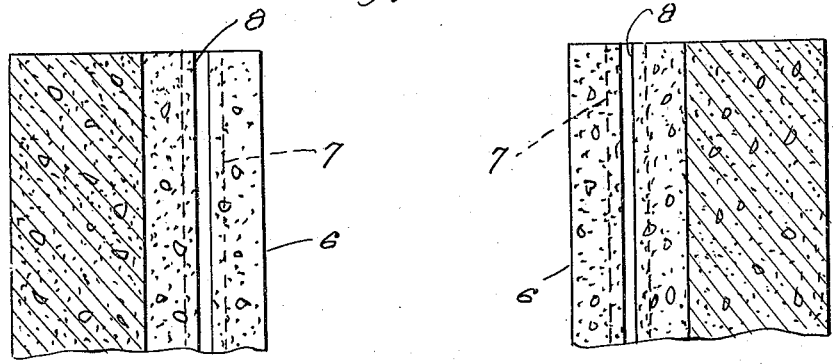
Figure 11:
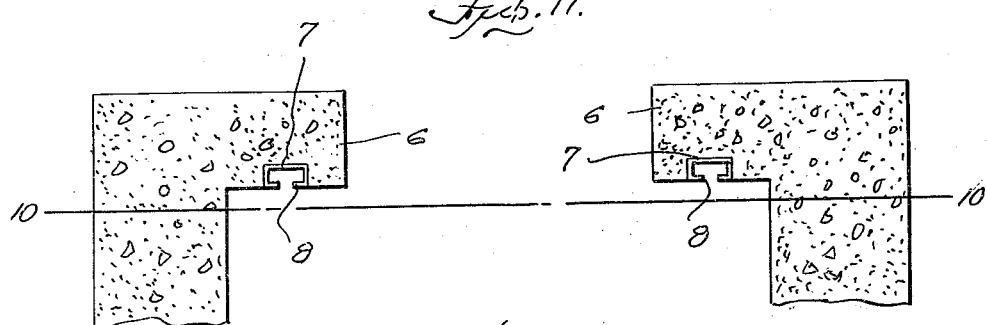
Figure 7:
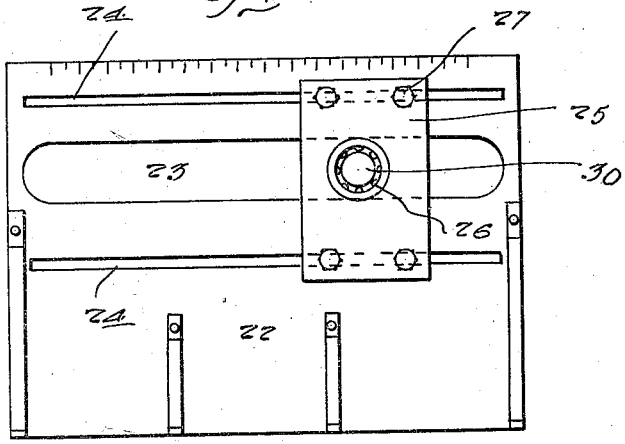

In the drawing:

Figure 1 is a top plan view of the apparatus embodying the features of my invention, Figure 2 is a side elevation thereof, Figure 3 is an end view of one of the pontoons and platform thereon, Figure 4 is a top plan view of one of the buckets or paddle like members, Figure 5 is a side elevation thereof, Figure 6 is an edge elevation of one of the bearings, Figure 7 is a side elevation thereof, Figure 8 is a detail sectional elevation of one end of one of the pontoons, Figure 9 is a detail view of one of the bearings, Figure 10 is a sectional view taken substantially on the line 10—10 of Figure 11, and Figure 11 is a top plan view of adjacent ends of the wall.

Referring to the drawing in detail it will be seen that numerals 5 denote a pair of spaced parallel coextensive walls adapted to be placed in a stream and formed at their ends with inwardly directed extensions 6 having formed therein vertical recesses 7 to receive tracks 8. Pontoons 9 of elongated hollow construction preferably made of metal and having outwardly tapering ends are mounted between the extensions 6 and on their ends have arms 10 on which are journaled rollers 11 to ride in the tracks 8 so as to prevent movement of the pontoon horizontally but allowing them to rise and fall with the stream in which they may be floating.

On each pontoon there is built a platform 12. A plurality of bearing blocks 15 rise from each platform 12 a row along one side and another row along the other side and suitable brackets 16 and 17 securely hold these bearing blocks in place and they are also braced by members 18.

Caps 19 are fastened on the blocks 15 by bolts 20 or in any other preferred manner and hold in place ball bearings 21. The blocks 15 are arranged in pairs on the platform. At one end of the platform, there is a pair of blocks 22 with horizontal oblong openings 23 therein and parallel slots 24 one above and one below each opening 23.

Plates 25 have bearings 26 sliding in openings 23 and bolts 27 slidable in slots 24 and by tightening the bolts 27 the plates 25 may be held in different adjusted position. A shaft 30 is journaled in bearings 26 across the two pontoons while a shaft 31 is journaled in bearings 21 in the other end blocks 15. Sprockets 32 are fixed to these shafts 30 and 31 and have trained thereover a pair of endless chains 33. Obviously these chains may be tightened by shifting plates 25.

Idler wheels 34 are on shafts 35 in the remaining bearings 31 between the runs of the chains 33 to prevent sagging of the upper runs of these chains. The shaft 31 is extended and has thereon a take off sprocket 35 about which is trained a chain 36.

A plurality of bucket like paddles 37 have plate extensions 38 hingedly mounted between the chains as is indicated at 39 and are limited in their swinging movement by chains 40 so that they may depend at right angles from the lower run of the chains as is clearly indicated in Figure 2. While along the upper runs of the chains, the buckets or bucket like paddles will be substantially parallel therewith and for this purpose I have provided their free edges with lateral extending stop brackets 42 for engaging the chains.

The pontoons are provided with suitable valves 43 so that they may be filled with compressed air or gas or the like to make them more bouyant.

From the above detailed description, it will be seen that when the apparatus is located in a stream flowing in the direction of the arrows 45 in Figure 2 the bucket like paddles 37 will engage with the surface current and pull the bottom runs of the chains in a like direction thereby causing the travel of the chains in their orbits about the sprockets, causing the rotation of the sprockets and power may be taken off through the shaft 31, the sprocket 34 and the chain 36 or in any other suitable manner.

The pontoons are prevented from moving with the streams because of the engagement provided with the extension 6 of the wall 5 but these pontoons may rise and fall with the tide or with the rise and fall of the streams from natural or unnatural causes.

It is thought that the construction, utility and advantages of this invention will now be quite apparent to those skilled in this art without a more detail description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, in the materials, in the dimensions, in the proportions, in the combination and arrangement of parts without departing from the spirit or scope of the invention as hereinafter claimed or sacrificing any of its advantages.

Having thus described my invention, what I claim as new is:

1. In an apparatus of the class described, a pair of vertical coextensive parallel spaced walls provided with inwardly directed end extensions, the inner surfaces of the extensions being provided with tracks vertically disposed, a pair of pontoons between the extensions and having arms at their ends, rollers journaled on the arms and disposed in the tracks, and power generator means supported on the platform.

2. In an apparatus of the class described, a pair of vertical coextensive parallel spaced walls provided with inwardly directed end extensions, the inner surfaces of the extensions being provided with tracks vertically disposed, a pair of pontoons between the extensions and having arms at their ends, rollers journaled on the arms and disposed in the tracks, platforms on the pontoons, bearings on the platforms, shafts journaled between the bearings to extend across the pontoons, sprockets on said shafts, a pair of chains trained over said sprockets, a plurality of bucket like paddles hingedly mounted between the chains.

3. In an apparatus of the class described, a pair of vertical coextensive parallel spaced walls provided with inwardly directed end extensions, the inner surfaces of the extensions being provided with tracks vertically disposed, a pair of pontoons between the extensions and having arms at their ends, rollers journaled on the arms and disposed in the tracks, platforms on the pontoons, bearings on the platforms, shafts journaled between the bearings to extend across the pontoons, sprockets on said shafts, a pair of chains trained over said sprockets, a plurality of bucket like paddles hingedly mounted between the chains, means for limiting swinging movement of the paddles so that they may depend at right angles from the lower runs of the chains or may lie flat on the upper runs of the chains.

4. In an apparatus of the class described, a pair of vertical coextensive parallel spaced walls provided with inwardly directed end extensions, the inner surfaces of the extensions being provided with tracks vertically disposed, a pair of pontoons between the extensions and having arms at their ends, rollers journaled on the arms and disposed in the tracks, platforms on the pontoons, bearings on the platforms, shafts journaled between the bearings to extend across the pontoons, sprockets on said shafts, a pair of chains trained over said sprockets, a plurality of bucket like paddles hingedly mounted between the chains, means for limiting swinging movement of the paddles so that they may depend at right angles from the lower runs of the chains or may lie flat on the upper runs of the chains, said last mentioned means comprising stop brackets extending laterally from the ends of the free edges of the paddles and chains connected to the paddles and flexible elements connected to the bucket and to the chains, means for shifting the shaft in respect to each other for tightening the chains, idler wheels, means for journalling and supporting the idler wheels in respect to the platform so as to be disposed between the runs of the chain.

5. In an apparatus of the class described, a pair of vertical coextensive parallel spaced walls provided with inwardly directed end extensions, the inner surfaces of the extensions being provided with tracks vertically disposed, a pair of pontoons, one pontoon of said pair being respectively disposed parallel to one of said spaced walls and movable vertically between the end extension of the respective walls, said pontoons being provided at their opposite ends with rollers movable in the tracks in adjacent end extensions of said walls, tracks formed on the pontoons, stationary bearings on the platform at one end of the platform, a shaft journaled between the bearings to extend across the pontoons, a sprocket wheel on said shaft, movable bearings on the platform at the other end of said platform, means for securing said movable bearings in a predetermined adjusted position, a shaft journaled in the last mentioned bearings to extend across the pontoons, sprockets on the last mentioned shaft, endless chains trained over these sprockets, and a plurality of paddles having concave surfaces and relatively flat surfaces hingedly connected at one end of their flat surfaces to the chains, and stop brackets extending laterally from the paddles at the concave surface and adapted to engage with the upper run of the chains whereby the paddles will be held in a horizontal position parallel to the upper run of the chains.

In testimony whereof I affix my signature.

FRANK L. GAEDE.